United States Patent [19]
Young

[11] Patent Number: 5,991,819
[45] Date of Patent: *Nov. 23, 1999

[54] DUAL-PORTED MEMORY CONTROLLER WHICH MAINTAINS CACHE COHERENCY USING A MEMORY LINE STATUS TABLE

[75] Inventor: Gene F. Young, Lexington, S.C.

[73] Assignee: Intel Corporation, Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/760,126

[22] Filed: Dec. 3, 1996

[51] Int. Cl.$^6$ ................................................. G06F 13/00
[52] U.S. Cl. ........................ 709/253; 709/213; 709/203; 711/139; 711/145
[58] Field of Search ............................. 395/200.83, 281, 395/200.44, 800.2, 800.29, 800.33, 200.43, 200.33; 711/138, 139, 145; 709/253, 213, 203

[56] References Cited

U.S. PATENT DOCUMENTS

| | | | |
|---|---|---|---|
| 5,001,671 | 3/1991 | Koo et al. | 365/230.05 |
| 5,025,365 | 6/1991 | Mathur et al. | 364/200 |
| 5,197,146 | 3/1993 | La Fetra | 395/425 |
| 5,228,135 | 7/1993 | Ikumi | 395/425 |
| 5,247,649 | 9/1993 | Bandoh | 395/425 |
| 5,249,283 | 9/1993 | Boland | 395/425 |
| 5,276,832 | 1/1994 | Holman, Jr. | 395/425 |
| 5,335,335 | 8/1994 | Jackson et al. | 395/425 |
| 5,361,340 | 11/1994 | Kelly et al. | 395/425 |
| 5,386,511 | 1/1995 | Murata et al. | 395/200 |
| 5,426,765 | 6/1995 | Stevens et al. | 395/425 |
| 5,506,971 | 4/1996 | Gullette et al. | 395/296 |
| 5,511,226 | 4/1996 | Zilka | 395/823 |
| 5,515,522 | 5/1996 | Bridges et al. | 395/468 |
| 5,519,839 | 5/1996 | Culley et al. | 395/310 |
| 5,524,215 | 6/1996 | Gay | 396/287 |
| 5,535,116 | 7/1996 | Gupta et al. | 364/134 |
| 5,548,730 | 8/1996 | Young et al. | 395/280 |
| 5,551,005 | 8/1996 | Sarangdhar et al. | 711/145 |
| 5,659,687 | 8/1997 | Kim et al. | 395/292 |
| 5,752,258 | 5/1998 | Guzovskiy et al. | 711/120 |
| 5,765,195 | 6/1998 | McDonald | 711/141 |

OTHER PUBLICATIONS

"A New Solution to Coherence Problems in Multicache Systems," Censier, Lucien M., et al., IEEE Transactions on Computers, vol. C–27, No. 12, Dec. 1978, pp. 1112–1118.

*Primary Examiner*—Meng-Ai T. An
*Assistant Examiner*—Gautam R. Patel
*Attorney, Agent, or Firm*—Blakely, Sokoloff, Taylor & Zafman LLP

[57] ABSTRACT

A symmetric multiprocessor system constructed from industry standard commodity components together with an advanced dual-ported memory controller. The multiprocessor system comprises a processor bus; up to four Intel Pentium® Pro processors connected to the processor bus; an I/O bus; a system memory; and a dual-ported memory controller connected to the system memory, the dual ported memory controller having a first port connected to the processor bus to manage processor to system memory transactions and a second port connected to the I/O bus to manage I/O transactions. Furthermore, two such systems can be connected together through a common I/O bus, thereby creating an eight-processor Pentium® Pro processor SMP system.

9 Claims, 12 Drawing Sheets

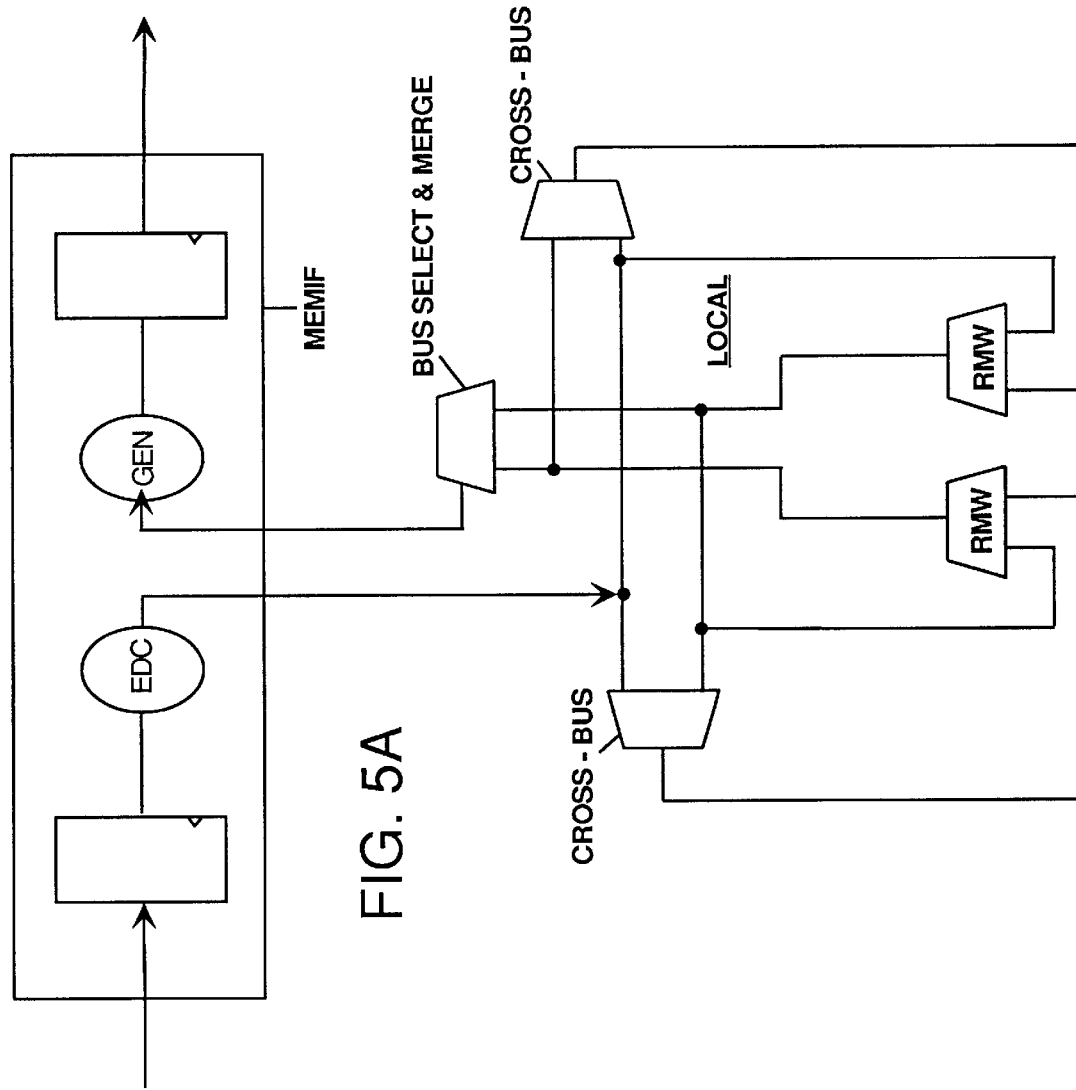

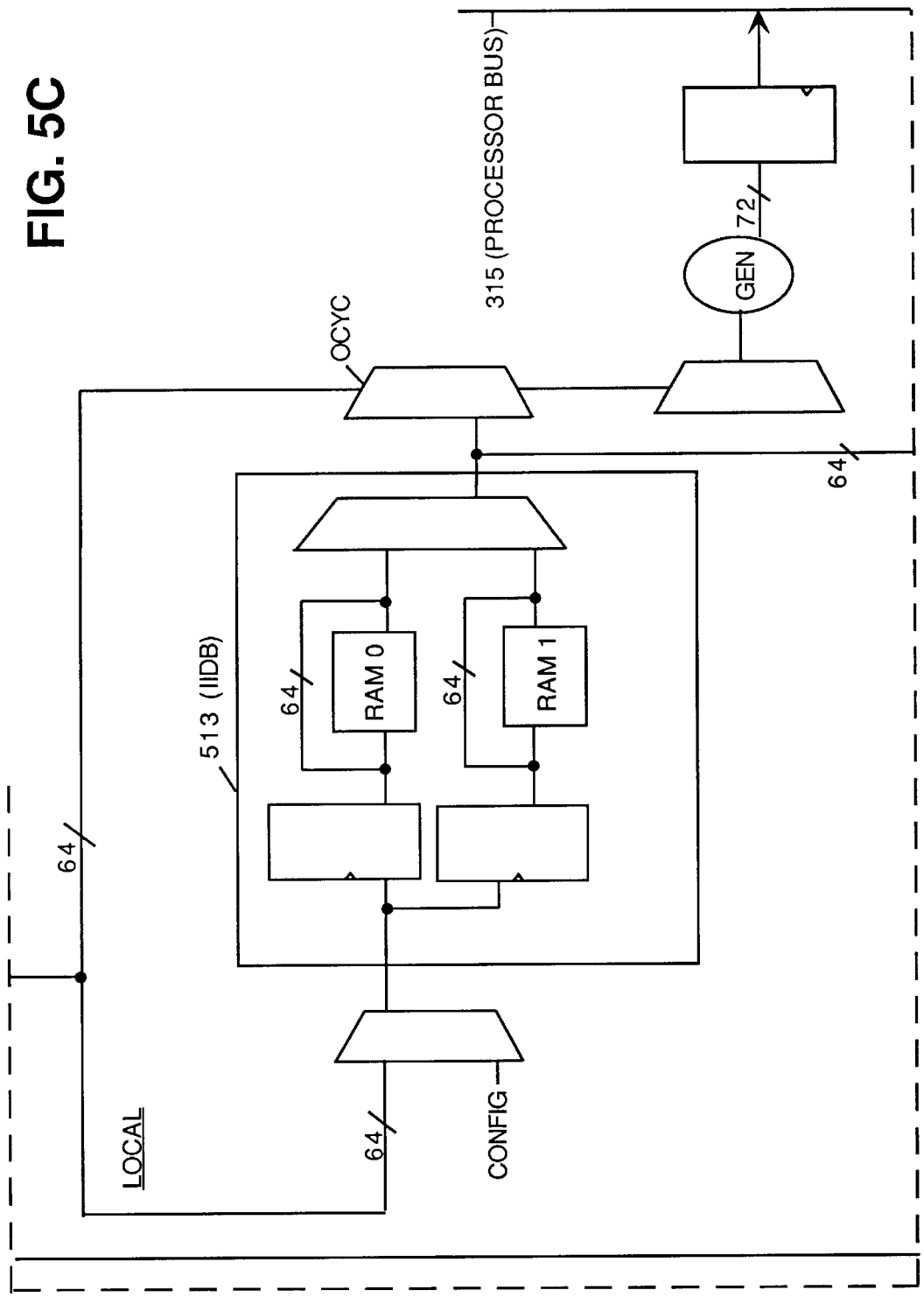

DUAL-PORTED MEMORY CONTROLLER WHICH MAINTAINS CACHE COHERENCY USING A MEMORY LINE STATUS TABLE

The present invention relates to multiprocessing computer systems and, more particularly, to symmetric multiprocessing (SMP) computer systems including multiple system busses.

BACKGROUND OF THE INVENTION

Currently available Standard High Volume (SHV) commodity computer components, such as processors, single in-line memory modules (SIMMs), peripheral devices, and other specific components, have made it possible to easily and cheaply design and build computer systems including personal computers and multiprocessor servers. While it is possible to create custom personal computer and server designs which may be more clever and efficient than systems fashioned from standard components, the benefits of volume pricing and availability provided by the use of commodity components imparts a significant advantage to computer systems constructed from commodity SHV components.

FIG. 1 provides a simple block diagram of a standard high volume (SHV) symmetric multiprocessing (SMP) computer system employing currently available commodity components. The design shown employs Intel Pentium® Pro™ processors and a high-performance bus and chipset, such as an Intel processor bus and 8245GX chipset, respectively, that are intended to be the SHV companions of the Pentium® Pro processor.

The system as shown in FIG. 1 includes up to four processors 101 connected to a high-bandwidth split-transaction bus 103. A system memory 105 is connected to bus 103 through a memory controller chipset 107. Connection to standard PCI devices, not shown, is provided through PCI I/O interfaces 109. As stated above, all of these components are currently available commodity components. The characteristics of the SHV architecture shown in FIG. 1 include:

Support for up to four processors 101 and two PCI interfaces 107 on a single bus 103.

A high-performance bus topology operating at 66 Mhz with a 64 bit datapath, and capable of a sustained data transfer rate of 533 MB/s.

A memory controller 107 consisting of two chips 111 and 113 which present two loads to bus 103.

processor bus-to-PCI I/O bridges (IOBs) 109 that will peak at a data transfer rate of 132 MB/s with a sustained data transfer rate of about 80 MB/s.

The architecture shown in FIG. 1, constructed of commodity components, simplifies the design of reasonably powerful multiprocessor system having up to four processors. However, the Pentium® Pro processor/processor bus architecture described above does not permit expansion beyond four processors. Other improvements to the system thus far described are also possible.

OBJECTS OF THE INVENTION

It is therefore an object of the present invention to provide a new and useful symmetric multiprocessor system constructed from industry standard commodity components.

It is another object of the present invention to provide such a system which provides support for up to eight or more processors.

It is yet another object of the present invention to provide a new and useful multiple bus symmetric multiprocessor system constructed from industry standard commodity components offering improved performance over existing single bus systems.

It is still a further object of the present invention to provide such a system which provides a first bus for processor to memory transactions and a separate bus for I/O transactions.

SUMMARY OF THE INVENTION

There is provided, in accordance with the present invention, a symmetric multiprocessor system constructed from industry standard commodity components together with an advanced dual-ported memory controller. The multiprocessor system comprises a snooped processor bus; at least one processor connected to the processor bus; an I/O bus; a system memory; and a dual-ported memory controller connected to the system memory, the dual ported memory controller having a first port connected to the processor bus to manage processor to system memory transactions and a second port connected to the I/O bus to manage I/O transactions.

In the described embodiment, up to four Intel Pentium® Pro processors are connected to the processor bus, and the processor bus and I/O bus are each Intel processor busses. Furthermore, two such systems can be connected together through a common I/O bus, thereby creating an eight-processor Pentium® Pro processor SMP system.

The above and other objects, features, and advantages of the present invention will become apparent from the following description and the attached drawings

BRIEF DESCRIPTION OF THE DRAWINGS

FIG. 5 illustrates the arrangement of the components of FIGS. 5A through 5I.

FIGS. 5A, 5B, 5C, 5D, 5E, 5F, 5G, 5H and 5I illustrate the data path logic of an advanced memory controller according to one embodiment of the invention.

DETAILED DESCRIPTION OF THE PREFERRED EMBODIMENT

The advanced multiprocessor architecture described herein uses system techniques pioneered by NCR while also advantageously making use of standard high volume (SHV) components, such as Intel Pentium® Pro processors, PCI I/O chipsets, Pentium® Pro processor chipsets, Pentium® Pro processor bus topology, and standard memory modules (SIMMs and DIMMs). Through careful integration of NCR system techniques with SHV components, NCR is able to deliver world class scalability and feature content while still capitalizing on SHV and without the disadvantage associated with full custom development.

1. One to Four Processor SMP Implementation

Figure 1:
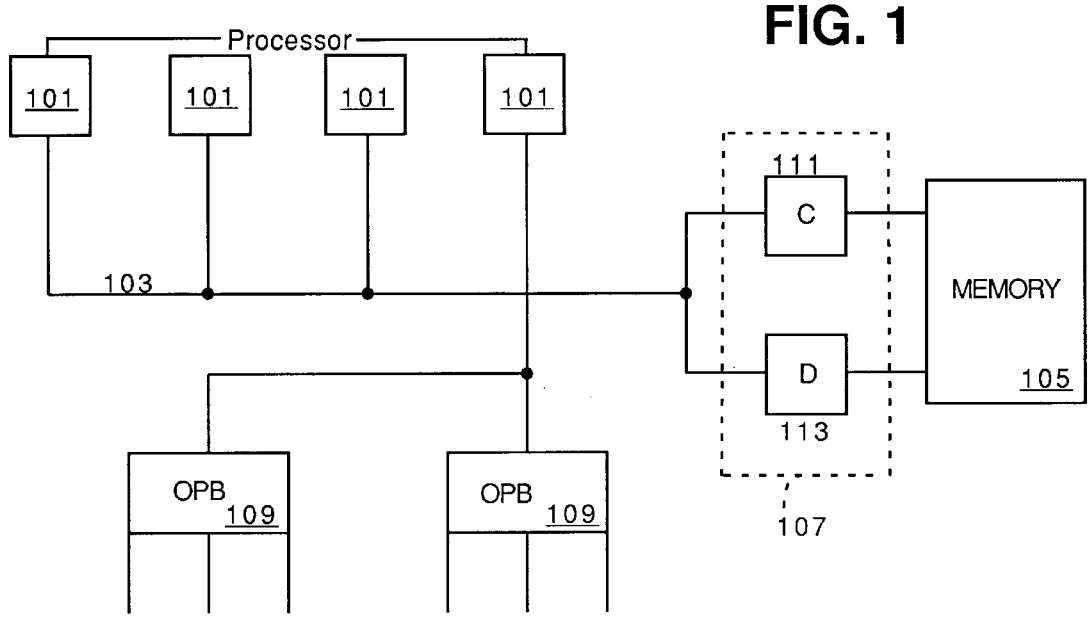
FIG. 1 is a simple block diagram representation of a four processor super high volume symmetric multiprocessing (SMP) computer system employing currently available commodity components.
Figure 2:
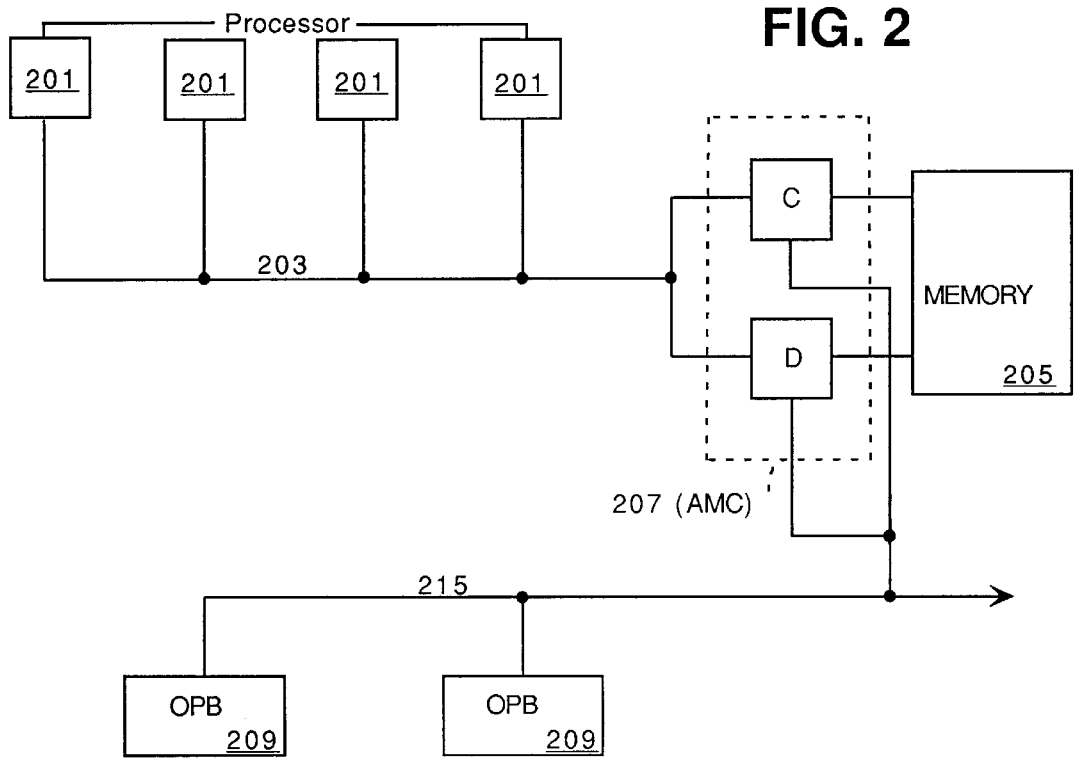
FIG. 2 is a simple block diagram representation of a super high volume (SHV) symmetric multiprocessing (SMP) computer system employing a dual ported advanced memory controller and providing support for more than four processors in accordance with the present invention.

FIG. 2 provides a simple block diagram representation of SHV symmetric multiprocessing computer system employing a dual ported advanced memory controller and providing support for up to four processors in accordance with the present invention. Note the similarities shown in the system of FIG. 2 and the commodity Pentium® Pro processor bus SHV system shown in FIG. 1.

The system as shown in FIG. 2 includes up to four processors 201 connected to a high-bandwidth split-transaction processor bus 203. A system memory 205 is connected to bus 203 through an advanced dual-ported memory controller 207. The processor bus 203 is connected to the first port of memory controller 207.The second memory controller port connects to a I/O bus 215, also referred to herein as an expansion bus, which provides connection for multiple PCI I/O interfaces 209. All of these components, with the exception of advance memory controller 207, are currently available commodity components.

The advanced memory controller (AMC) 207 manages control and data flow in all directions between the processor bus 203 and I/O bus 215. The I/O bus may contain processor bus to PCI I/O Bridges and another AMC ASIC for connectivity to another processor bus, as will be discussed below. The AMC 207 also controls access to a coherent DRAM memory array. The AMC as presently implemented consists of a control and data slice ASIC pair. A more detailed discussion of the NCR Advanced Memory Controller will be provided below.

The four processors use a bus snooping protocol on the processor bus 203. Bus snooping is a method of keeping track of data movements between processors and memory. There are performance advantages to this system with a small number of tightly-coupled processors. If a processor needs data that is available in the data cache of another processor on the same bus, the data can be shared by both processors. Otherwise, the data must be retrieved from main memory 205, a more time consuming operation which requires system bus traffic. This method enhances system performance by reducing system bus contention.

The characteristics of the NCR architecture shown in FIG. 2 include:

Capitalizes on industry SHV architecture and supporting commodity chips (IOB. etc.)

Dual ported memory controller 207 permits connection and utilization of dual buses, each operating at 66 MHz with a bandwidth of 64 bits and capable of sustained data transfer rates of 533 MB/s.

Dual bus approach provides greater scalability through a reduction of bus loadings and provision of a private processor to memory path that can operate independent of IOB to IOB traffic.

Additional processors and I/O devices can be connected to the expansion bus 215.

The system as described is able to fill High Availability Transaction Processing (HATP) and Scaleable Data Warehouse (SDW) server needs, while capitalizing on the industry SHV motion.

2. Four to Eight Processor SMP Implementation

The advanced SMP architecture shown in FIG. 2, as well as the SHV architecture shown in FIG. 1, show systems containing up to four processors. However, the advanced architecture of the present invention is designed to allow two complexes, each similar to that shown in FIG. 2, to be interconnected to form an eight-processor system.

Figure 3:
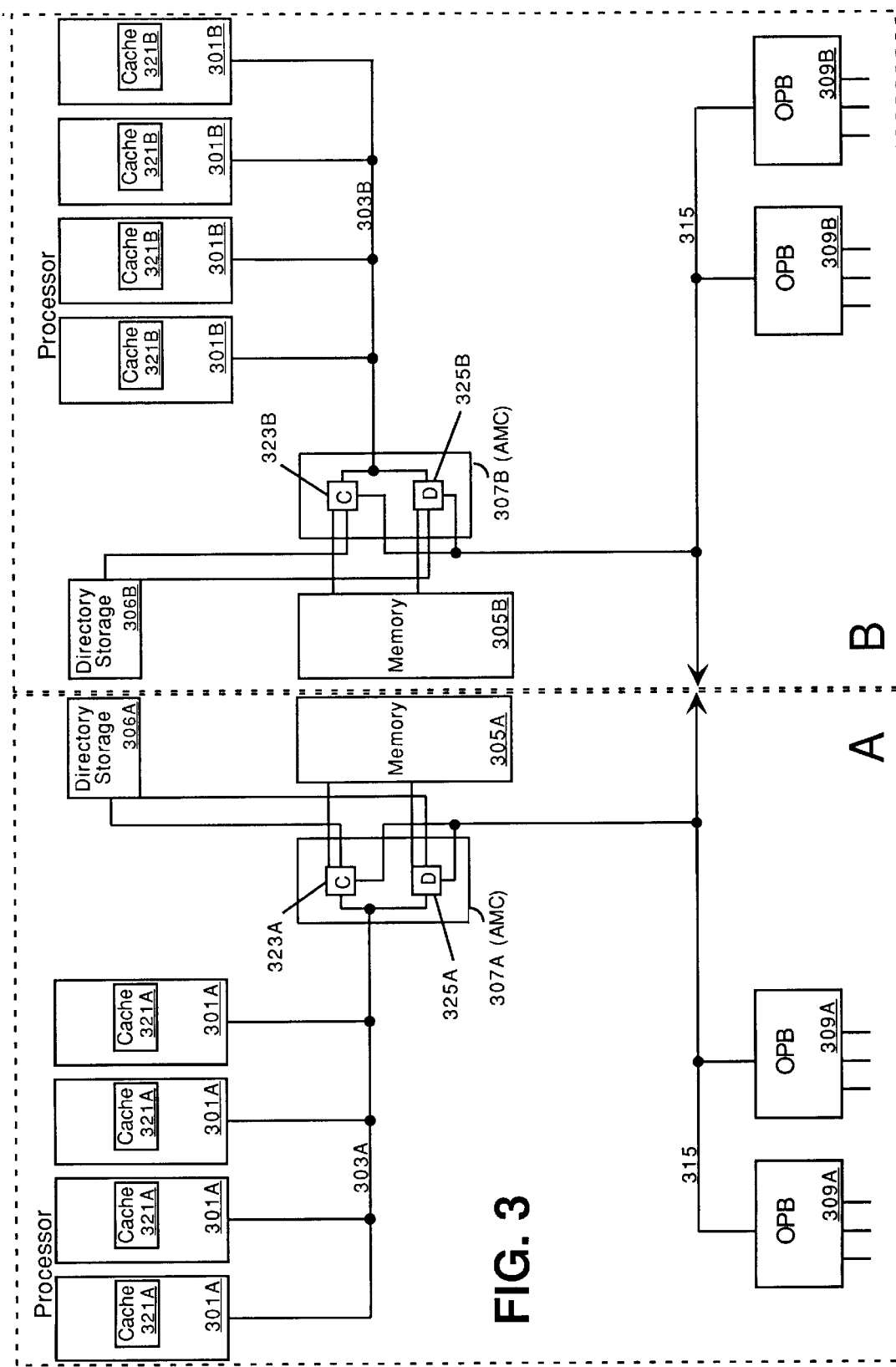
FIG. 3 is a simple block diagram representation of an eight processor super high volume symmetric multiprocessing (SMP) computer in accordance with the present invention.

FIG. 3 illustrates an eight-processor SMP system formed of two four-processor building blocks. Each block, identified by reference numerals A and B, is seen to include all of the structure shown in FIG. 2. System components are identified by reference numerals ending in an A or a B, for complex "A" and "B", respectively. However the two systems are interconnected thorough a common expansion bus 315. From this Figure it is easy to see the modularity and versatility of this system. Additional structure, not shown in FIG. 2, includes a cache memory 321A and 321B associated with each processor 301A and 301B, respectively.

In any system employing a data cache memory, and particularly a system employing multiple cache memories, data from a given memory location can reside simultaneously in main memory and in one or more cache memories. However, the data in main memory and in cache memory may not always be the same. This may occur when a microprocessor updates the data contained in its associated cache memory without updating the main memory and other cache memories, or when another bus master changes data in main memory without updating its copy in the microprocessor cache memories.

To track the data moving between the processors, system memories 307A and 307B, and the various cache memories, the system utilizes a hybrid of memory and cache based coherency. Coherency between system memory and caching agents is maintained via a combination centralized/distributed directory-based cache coherency.

A directory-based cache coherency scheme is a method of keeping track of data movements between the processors and memory. With this approach to data coherency, a memory status table identifies which processors have which lines of memory in their associated cache memories. When a processor requests data, the status table identifies the location within main memory or processor cache memory where the most current copy of the data resides. The advantage of this method is that no additional work must be performed until a processor needs data that resides in a cache that cannot be accessed through snooping. Directory-based cache coherency is most effective with a large number of tightly-coupled processors on a system bus.

The centralized/distributed directory-based cache coherency scheme employed in the system shown in FIG. 3 consists of two directory elements. The central element within the directory scheme resides in the system memories and is called the Memory Line Status Table (MLST). Each memory line within system memory includes a corresponding entry in its MLST. This corresponding entry contains information indicating whether or not a line is cached, and if so, whether it is exclusively owned by one processor (or processor bus), or shared across multiple processors (or processor buses). The directory scheme and MLST can be set up to identify memory line ownership by processor bus or by processor. The "bit-per-bus" MLST distinguishes ownership on a bus basis, while the more granular "bit-per-processor" MLST distinguishes ownership on a processor basis. Note that the distinction is specific to a memory design and hence transparent to any other device on the system bus. Distributed directory elements reside locally within each processor's cache directory. The element associated with a particular processor is referred to as its Processor Line Status Table (PLST). Each cache line has a corresponding entry in the PLST. From the local processor's perspective this entry contains information indicating whether or not a line contains a valid copy of a main memory line, and if so, whether or not modifications to that line must be broadcast to the rest of the system. From the system's perspective, each processor's PLST is a slave to special system bus cycles known as Memory Intervention Commands (MICs). These cycles query the PLST as to the local state of a particular line, and/or tell the PLST to change that local state.

The Modified-Exclusive-Shared-Invalid (MESI) cache coherency protocol is a hardware-implemented protocol for maintaining data consistency between main memory and data cache memories. A typical implementation of the MESI hardware cache coherency protocol requires the utilization of cache controllers having the ability to:

1. use the same line size for all caches on the memory bus;
2. observe all activity on the memory bus;
3. maintain state information for every line of cache memory; and
4. take appropriate action to maintain data consistency within the cache memories and main memory.

MESI represents four states which define whether a line is valid, if it is available in other caches, and if it has been modified. Each line of data in a cache includes an associated field which indicates whether the line of data is MODIFIED, EXCLUSIVE, SHARED, or INVALID. Within the Processor Line Status Table each cache line is marked in one of the four possible MESI states:

MODIFIED (PM)—This state indicates a line of data which is exclusively available in only this cache, and is modified. Modified data has been acted upon by a processor. A Modified line can be updated locally in the cache without acquiring the shared memory bus. If some other device in the system requires this line, the owning cache must supply the data.

EXCLUSIVE (PE)—This state indicates a line of data which is exclusively available in only this cache, that this line is not Modified (main memory also has a valid copy), and that the local processor has the freedom to modify this line without informing the system. Exclusive data can not be used by any other processor until it is acted upon in some manner. Writing to an Exclusive line causes it to change to the Modified state and can be done without informing other caches, so no memory bus activity is generated. Note that lines in the (PE) state will be marked (MO) in the MLST, as will be described below.

SHARED (PS)—This state indicates a line of data which is potentially shared with other caches (the same line may exist in one or more caches). Shared data may be shared among multiple processors and stored in multiple caches. A Shared line can be read by the local processor without a main memory access. When a processor writes to a line locally marked shared, it must broadcast the write to the system as well.

INVALID (PI)—This state indicates a line of data is not available in the cache. Invalid data in a particular cache is not to be used for future processing, except diagnostic or similar uses. A read to this line will be a "miss" (not available). A write to this line will cause a write-through cycle to the memory bus. All cache lines are reset to the (PI) state upon system initialization.

In accordance with the MESI protocol, when a processor owns a line of memory, whether modified or exclusive, any writes to the owned line of memory within main memory will result in an immediate update of the same data contained within the processor's data cache memory.

The Memory Line Status Table marks a memory line in one of three possible states: NOT CACHED (MNC), SHARED (MS), and OWNED (MO). The letter M distinguishes these states from PLST states, which are identified by use of the letter P. Additionally there are bus and/or processor state bits indicating sharing or ownership on either a bus or processor basis.

NOT CACHED (MNC): Indicates that no cache has a copy of that line. All memory lines must be reset to the (MNC) state upon system initialization.

SHARED STATE (MS): Indicates that one or more caches potentially have a copy of that line.

OWNED STATE (MO): Indicates that one and only one cache potentially has a copy of that line, and that the data in memory potentially does not match it (Memory data is referred to as stale).

Note the word "potentially" used in the definition of the shared and owned states. There are several situations in which the MLST does not have the most up-to-date information about a particular memory line. For example, the MLST may mark a line as shared by two particular processors since it saw them both read it. However, both processors may have long since discarded that line to make room for new data without informing the MLST (referred to as "silent replacement"). The MLST will naturally "catch up" to the latest state of a particular line whenever an access to that line by some master forces a MIC. In this example, a write by a third processor to this line will initiate a (now superfluous) MIC to invalidate other cached copies, and will bring the MLST up-to-date. Note however that the MLST always holds a conservative view of the state of cache lines. That is, a line that is owned or shared by a processor will always be marked correctly in the MLST. "Stale" information in the MLST takes the form of lines marked owned or shared that are no longer present in any processor's data cache.

As stated above, the MLST includes additional bus and/or processor state bits indicating sharing or ownership on either a bus or processor basis.

The Bit-per-Bus Protocol uses three memory state bits per line to indicate the current state of the line. One bit indicates shared or owned, and the other two depict which bus (A or B) or buses (A and B) have the line shared or owned. Bus ownership indicates that one of the processors on that bus owns the line. Note that a line can be owned by only one processor and therefore by only one bus. A shared line can be shared by one or more processors on each bus.

TABLE 1

Memory State Bits for Bit-per-Bus Protocol

| OBA | STATE BIT DEFINITIONS | DESCRIPTION |
|---|---|---|
| 000 | MNC - Not Cached; | Not owned or shared |
| 001 | MS - Shared; | Shared on Bus A |
| 010 | MS - Shared; | Shared on Bus B |
| 011 | MS - Shared; | Shared on Buses A and B |
| 100 | x - (not a valid state) | |
| 101 | MO - Owned; | Owned by Bus A |
| 110 | MO - Owned; | Owned by Bus B |
| 111 | x - (not a valid state) | |

The Bit-per-Processor Protocol has an MLST consisting of n+1 bits per line (n is equal to the number of processors) to indicate the current state of that line. One bit indicates whether the line is shared (MS) or owned (MO), and the other n bits depict which processor or processors have the line cached. A particular processor is numbered Pi, where i=0 to n−1. All Pi, where i is even, are on bus A, and all Pi, where i is odd, are on bus B. Processor ownership indicates which processor (only one) owns the line. A shared line can be shared by one or more processors on either or both buses.

TABLE 2

Memory State Bits for Bit-per-Processor Protocol

| O | P0..Pn-1 | STATE BIT DEFINITIONS |
|---|---|---|
| 0 | all zeros | MNC - Not Cached |
| 0 | one or more set | MS - Shared |
| 1 | only one set | MO - Owned |
| 1 | more than one set | x - (not a valid state) |
| 1 | all zeros | x - (not a valid state) |

3. NCR Advanced Memory Controller

The NCR Advanced Memory Controller (AMC) manages control and data flow in all directions between a processor bus (also referred to herein as the CPU bus) and a I/O bus (also referred to herein as the expansion bus). The I/O bus may contain processor bus-to PCI I/O Bridges and another AMC ASIC for connectivity to another processor bus. The AMC also controls access to a system memory.

At its highest level, the AMC is made up of a CPU side interface, an I/O side interface, logic for controlling a Memory Line Status Table (MLST) and generating/controlling Memory Intervention Commands (MICs), and a dual-ported DRAM controller.

Figure 4:
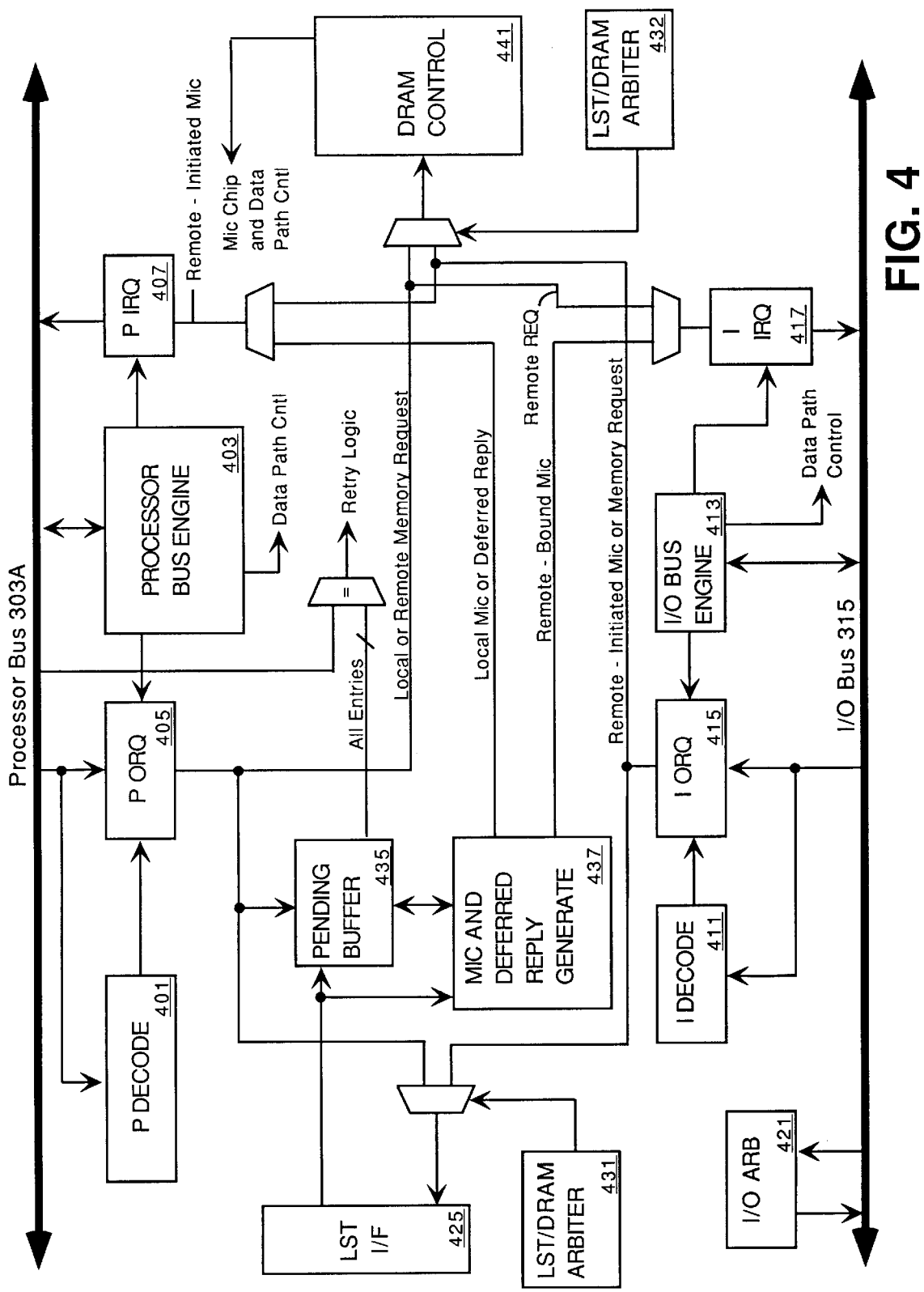
FIG. 4 is a block diagram illustration of the control logic included within the advanced memory controller shown in FIGS. 2 and 3.
Figure 5B:
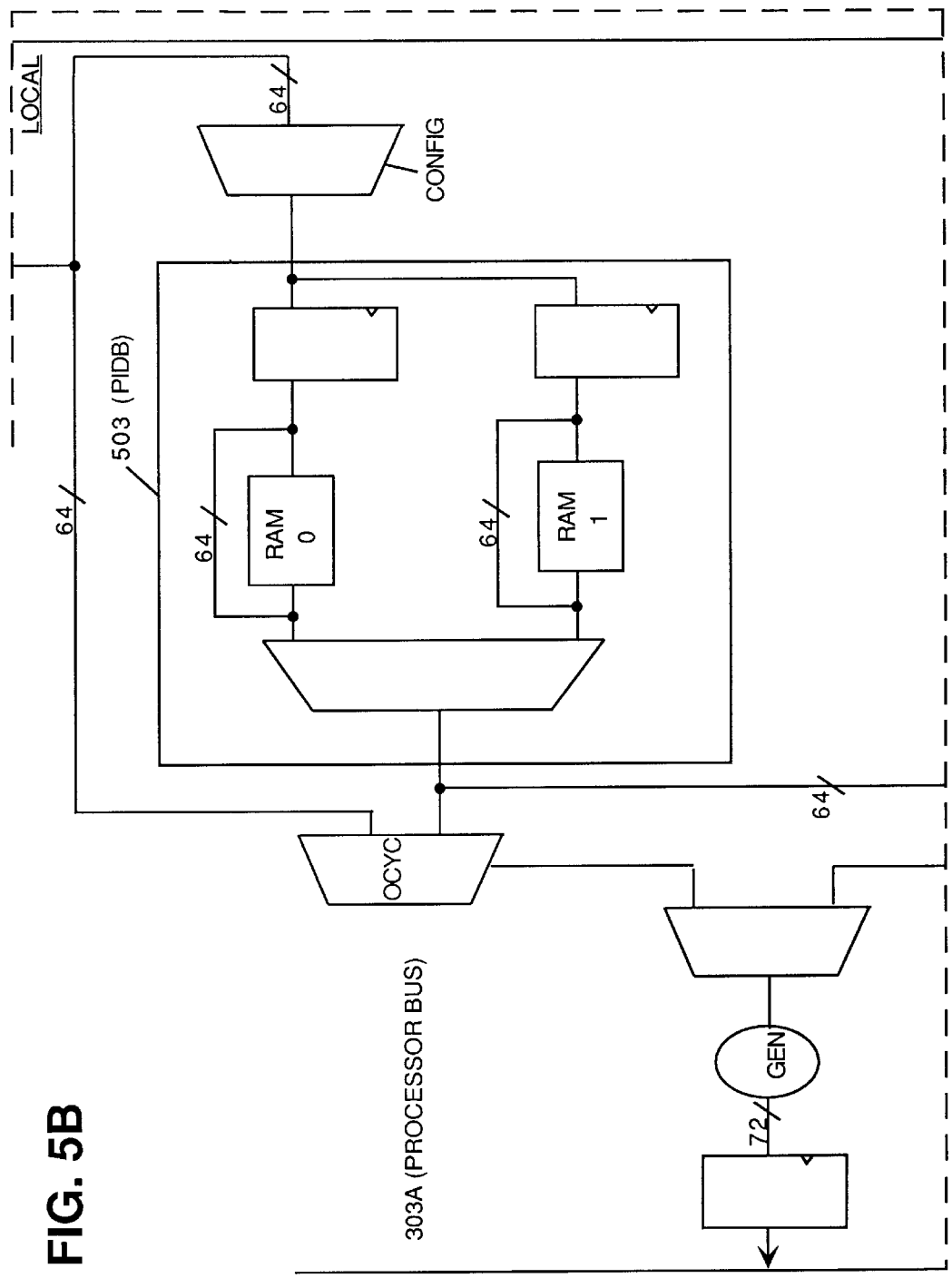
Figure 5D:
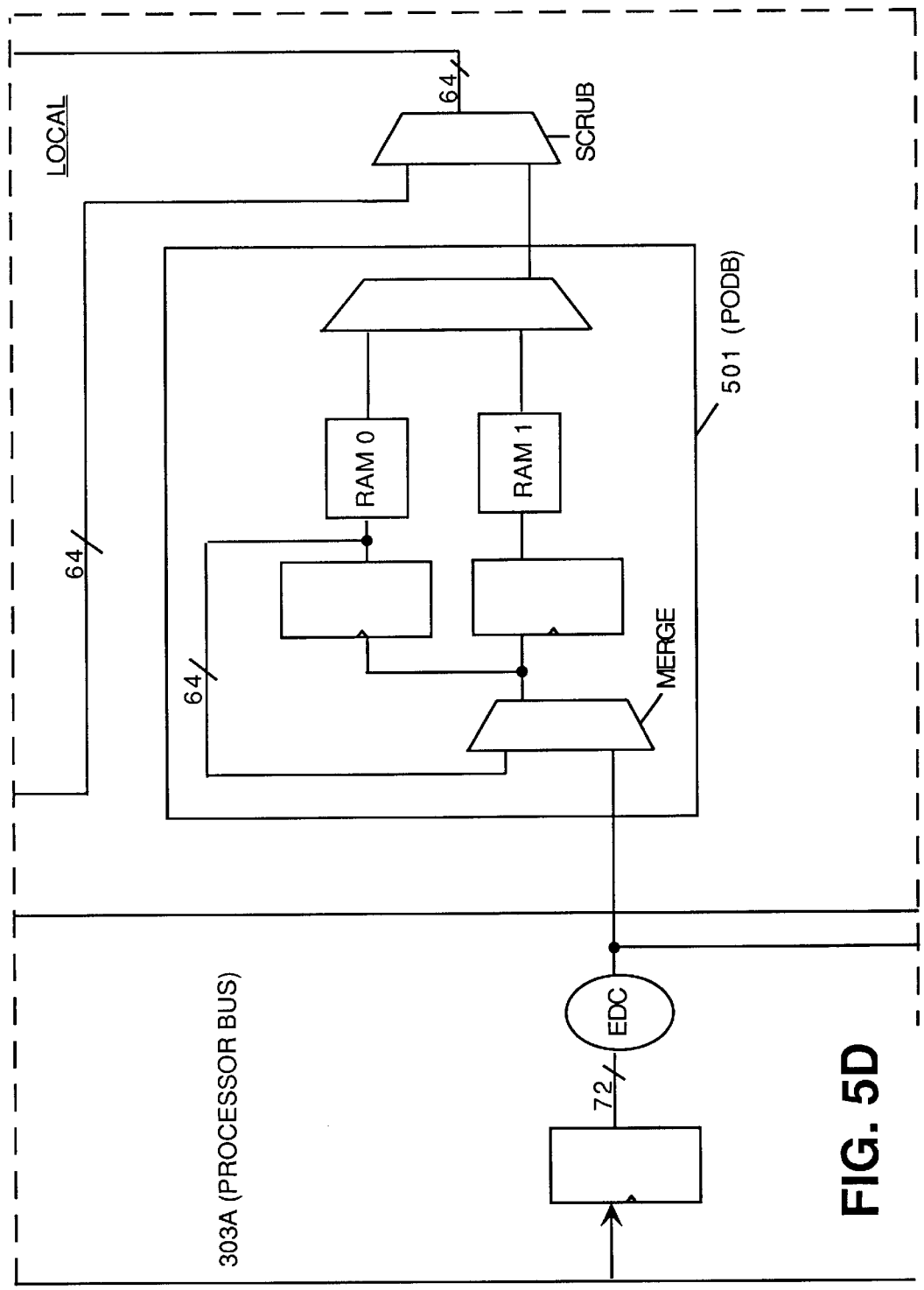
Figure 5E:
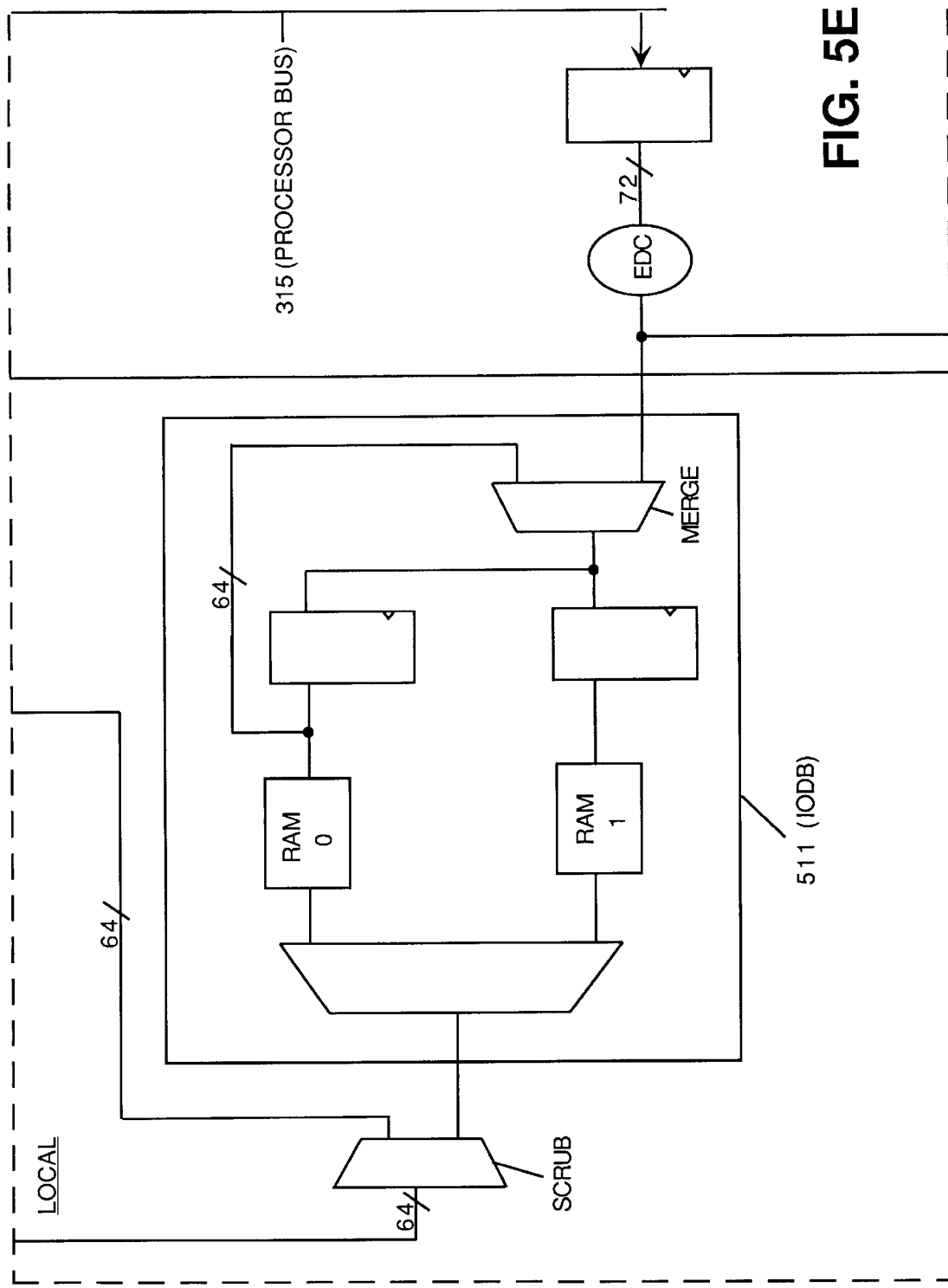
Figure 5F:
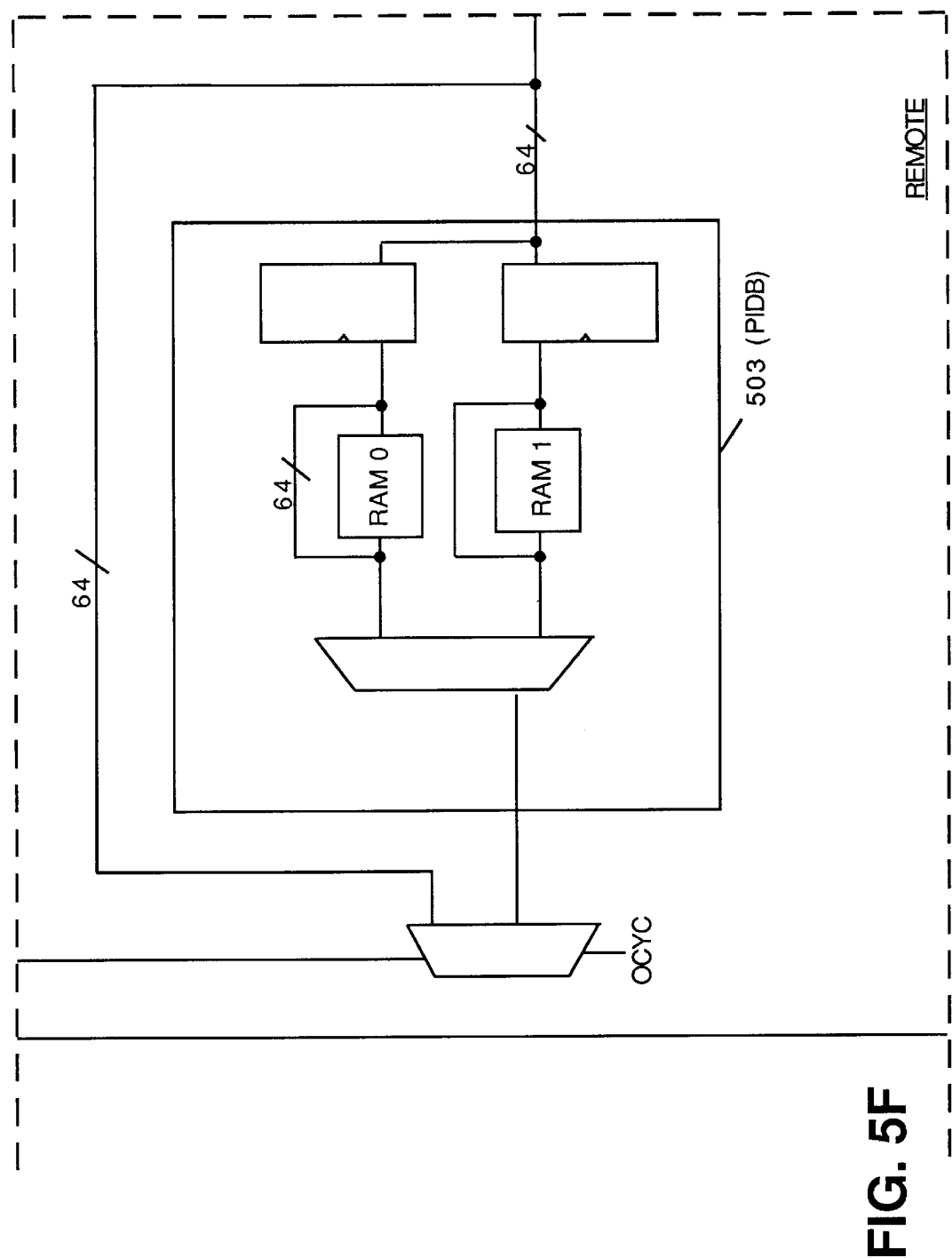
Figure 5G:
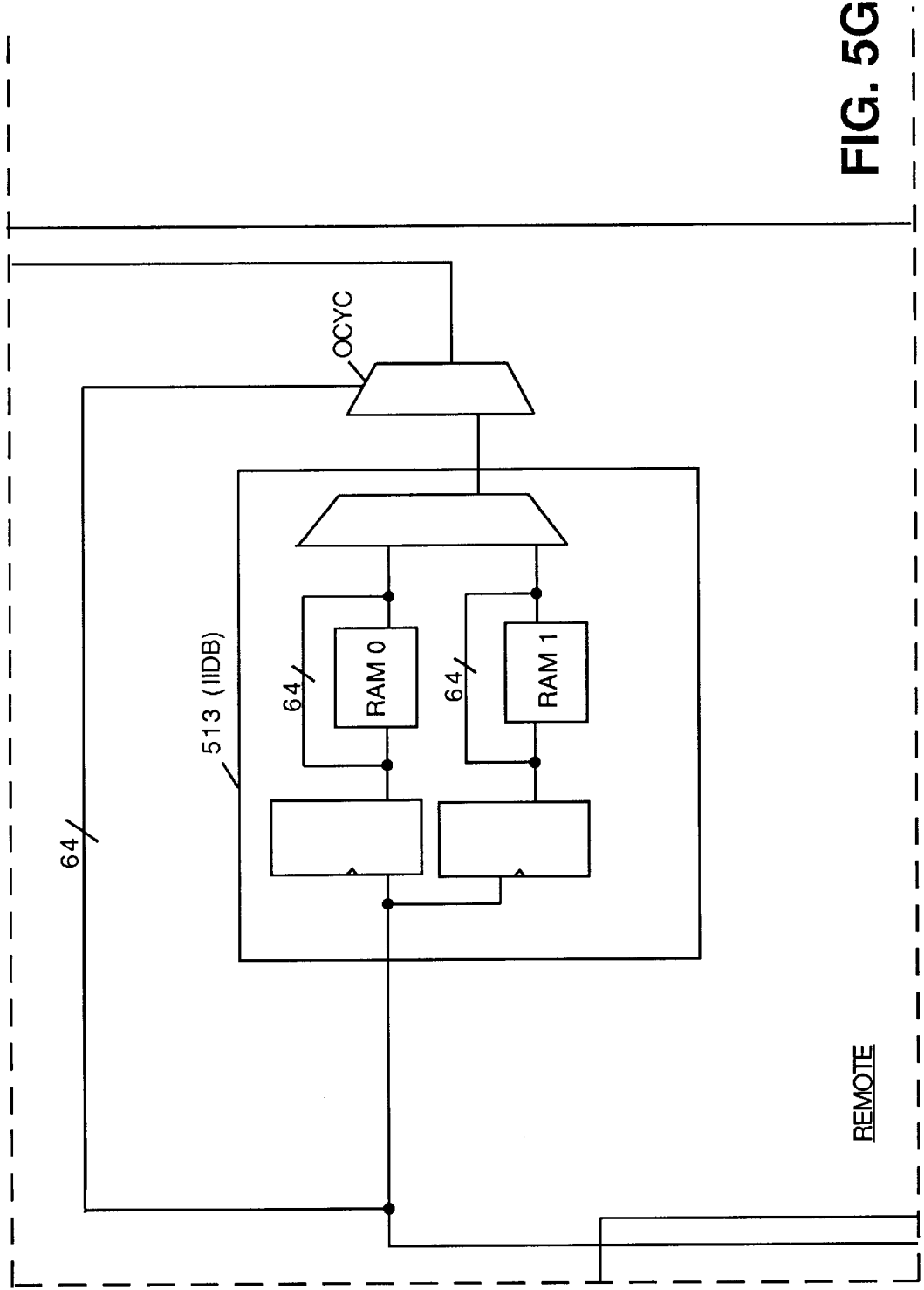
Figure 5H:
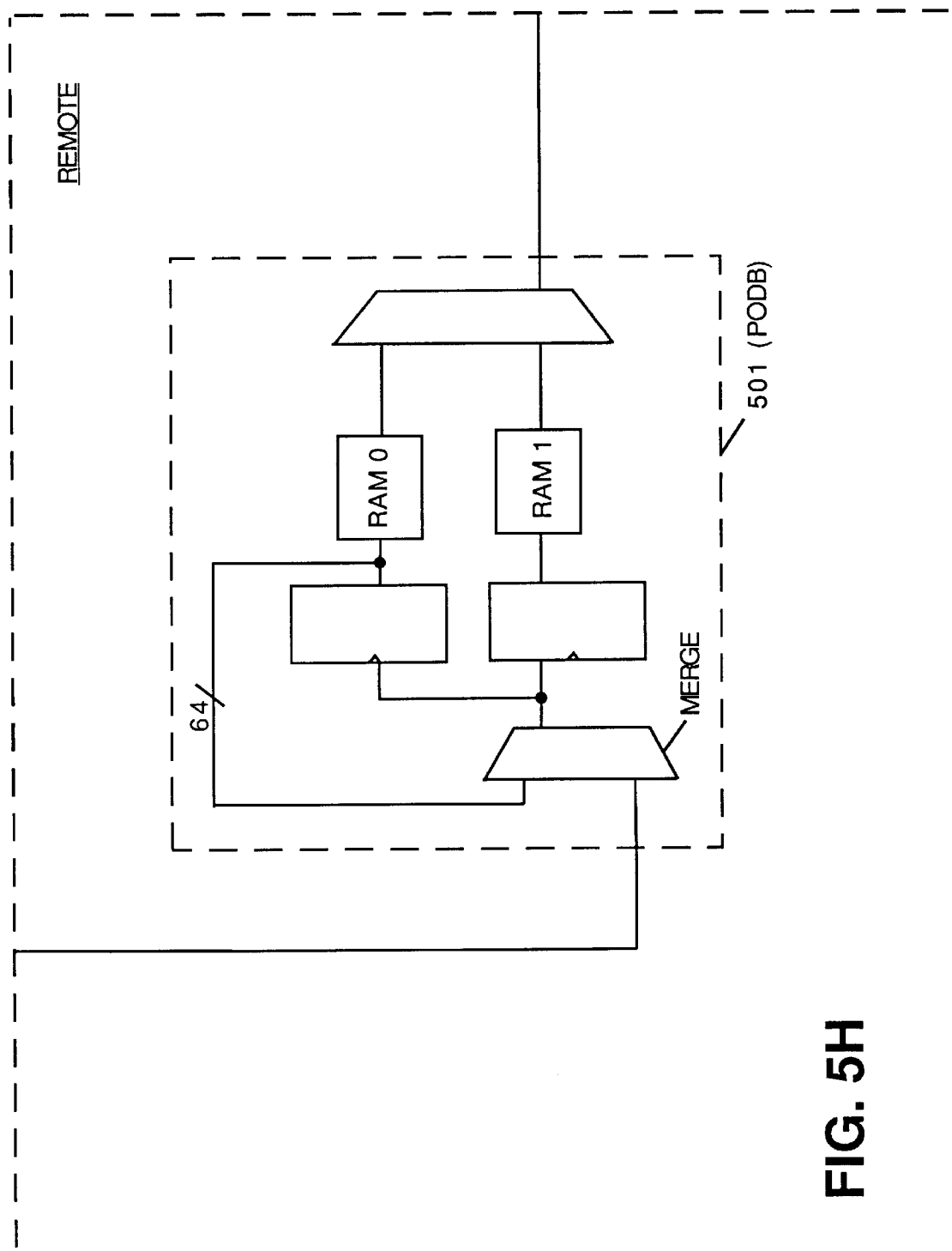
Figure 51:
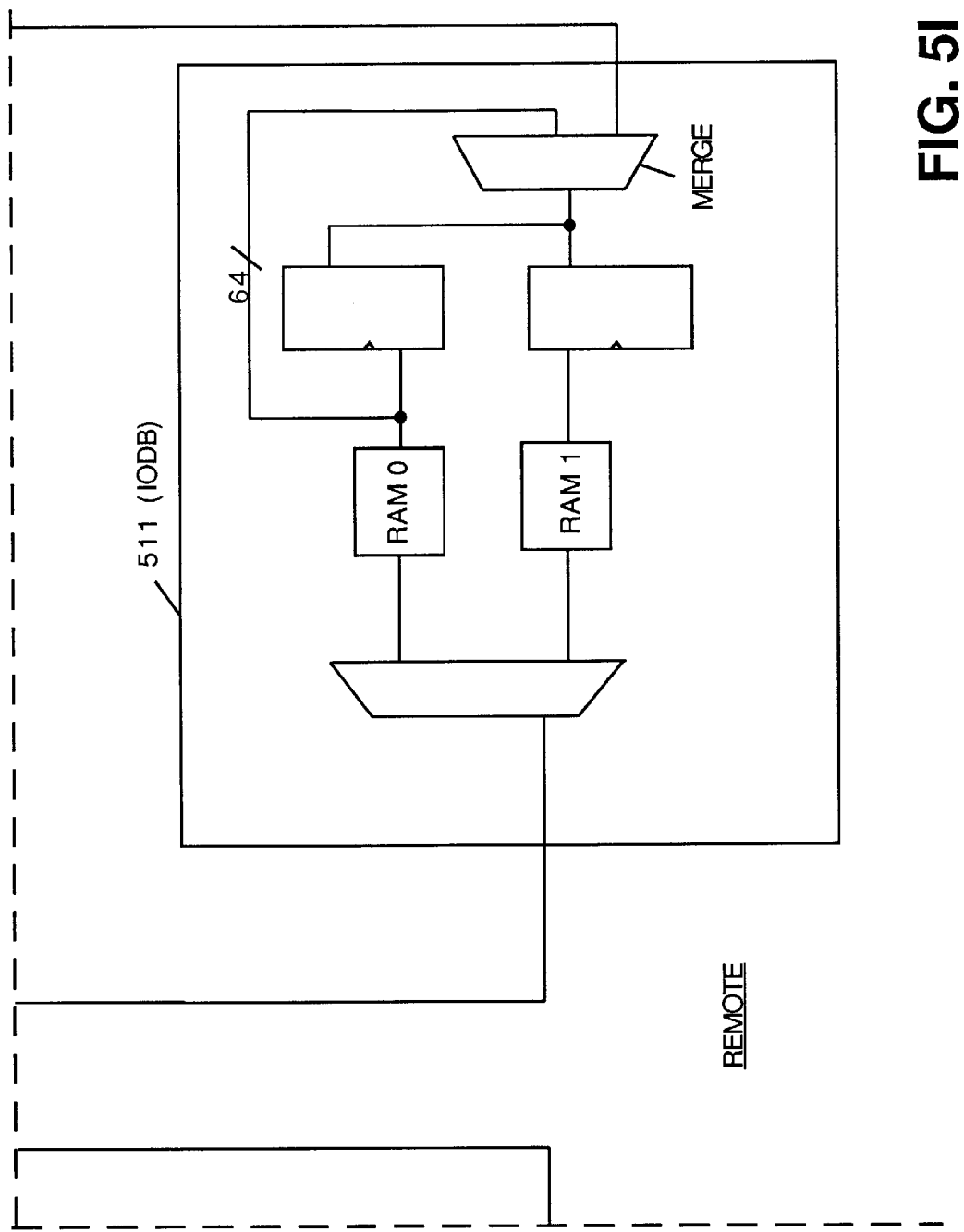

Further granularity of these blocks is described in the following subsections. These logic blocks are partitioned into two ASICs—a control logic ASIC (the AMC_DC chip) and a data path logic ASIC (the AMC_DP). FIG. 4 provides a block diagram illustration of the control logic included within the advanced memory controller, and FIG. 5 provides a block diagram illustration of the data path logic included within the advanced memory controller.

3.1 CPU Bus Side

3.1.1 CPU Decoder Logic (PDEC) 401

This logic examines every request on the CPU bus and determines whether the request is targeted at this chip (the request should be loaded into its CPU Outbound Request Queue). The logic determines whether the request should be forwarded to its DRAM controller unit, or forwarded out onto the I/O bus.

The CPU Decoder Logic also works with the MLST/MIC Control Logic. It can cancel MLST lookups that may have started when the decode results show the request is targeting Remote memory or I/O. 3.1.2 CPU BUS Engine (PBE) 403

The CPU Bus Engine contains all the circuitry necessary for efficient communication between the up to four processors on its CPU bus and the AMC. The CPU Bus Engine includes the following logic sub-blocks: Bus Tracking Queues and Control, Data Buffer Allocation/Transfer Logic, Control Signal/Response Generation, and Requesting Agent Logic.

3.1.2.1 Bus Tracking Queues and Control

The Bus Tracking Queue (BSTQ) is responsible for tracking all bus transactions that are initiated on the CPU bus. It is a single physical structure which implements the 4 logical structures of the processor bus: the In-Order queue, which tracks all transactions on the processor bus, the Snoop Queue, the Out-Bound Buffer Allocation Queue and the Internal Tracking Logic Queue. The BSTQ is a moderate sized structure which allows the resource to track the state of the current operation as it relates to this resource (AMC) and other resources processors on the CPU bus. The table below lists the information that is contained within the BSTQ.

TABLE X

Bus State Tracking Queue bit assignments

| BSTQ field | # bits | Function |
|---|---|---|
| Transaction Responding Agent (tra) | 1 | This bit is set to indicate that the request assigned to this element is targeted to this resource. |
| Snoop Window Complete (swc) | 1 | This bit is set to a '1' when the snoop result phase for this request has completed on the CPU Interface. |
| Internal Operation Commit (ioc) | 1 | This b t is set to a '1' by the target block to indicate that the data operation is complete. The ioc bit may be set to a '1' at the access initiation or a 'O' and be set to a 'I' at a later time. If the ioc bit is set to a 'O' at the initiation of the request, the snoop result phase of this request will be extended until ioc is set to a '1'. |
| RequestOr (ro) | 1 | This bit is set to a 'I' if this resource initiated the request logged into this BSTQ element. |
| Data Buffer Pointer (db) | 3 | These bits contain the pointer of the data buffer element (outbound or inbound) assigned to this request. |
| Transfer Direction (Trndir) | 1 | This bit specifies the direction of the data transfer requested for this access. |
| Response Type (rt) | 3 | These bits are used to determine the transaction response for a given request. |
| Data Length (Len) | 2 | This field is used to specify the length of the data transfer of the original request |

3.1.2.2 Data Buffer Allocation/Transfer Logic

The Data Buffer Allocation logic is used to control the allocation of the data buffers to the requests initiated on the CPU bus. The data buffers are allocated for both read and write operations. Data buffers are allocated for read operations with the anticipation that the read could be converted to an implicit writeback.

The Data Transfer logic is responsible for controlling the signals to initiate the transfer of data on the CPU interface. This logic is responsible for the generation of DBSY#, TRDY# (both by the AMC control logic ASIC), and DRDY# (by the AMC data path logic ASIC).

3.1.2.3 Control Signal/Response Generation

The Response Generation logic venerates the response for transactions owned by the AMC on the CPU bus. This will be ALL transactions on the CPU bus except for Branch Trace messages if the Enable Branch Trace Message Response Shadow hit is equal to 'O' and the Shadow Bit Enable is equal to I. This mode is only used when In-Circuit Emulator test equipment is used on the processor bus for debug purposes.

The Control Signal Generation logic is responsible for the generation of the various signals that are used to control the rate of requests on the CPU bus and to a large extent, the depth of the bus pipeline.

3.1.2.4 Requesting Agent Logic

The Requesting Agent Logic block consists of those elements within the Bus Engine that are required for the AMC to be a bus master on the CPU bus. The AMC will become a CPU bus requesting agent for Deferred Replies, and for MIC invalidates (BRPS, BELS, or BRILS) that are initiated by its local MIC Generation block or by the MIC generation logic of a Remote AMC.

3.1.3 CPU Queue Management Unit (PQMU)

The CPU Queue Management Unit contains the inbound and outbound request queues and data buffers to/from the CPU bus. Inbound and outbound here are referred to with respect to the processor bus. This means the Outbound Request Queue contains requests outbound from the processor bus INTO the AMC; the Inbound Request Queue contains requests inbound to the processor bus out form the AMC.

3.1.3.1 Outbound Request Queue (PORQ) 405

The CPU Outbound Request Queues hold pending CPU bus requests targeted at the AMC. Every transaction on the CPU bus is initially loaded into the PORQ; however the CPU Decoder will allow subsequent requests to overwrite previous requests that were not decoded to be to the AMC. The PORQ is actually implemented as two parallel queues. one targeted for local decode requests (Local PORQ), and one targeted for remote decode requests (Remote PORQ). Both queues are loaded in parallel, but only one (or none) of the two is "pushed" (marked as valid). The PORQ queues contain two logical records for each pending request: the request which holds the request address and command, and the request status which holds status (error, snoop) information. The address/command field of the Local PORQ also includes an Effective address field that is loaded by the CPU Decoder.

The address/command record is not changed once it is loaded into the PORQ; however, the status record is updated dynamically after the PORQ element is initially loaded. This is done by allowing the CPU Bus Engine or LST logic to "address" PORQ elements via the 3-bit InOrderQueue field of the PORQ for updating.

Requests "popped" off of the Local PORQ are routed either to the DRAM controller and/or the Pending Buffer Logic block; requests "popped" off of the Remote PORQ are routed to the I/O Inbound Request Queue (IIRQ) for forwarding to the I/O bus AND if deferrable, are also loaded into an open entry in the Pending Buffer. Responsibility for popping requests from the Local PORQ is determined by whether the locally-decoded request is a MIC or not, and if a MIC, whether or not the MIC may contain implicit writeback data.

For situations where the PORQ is empty, it can be bypassed (in parallel with its load) to facilitate the quickest path to the DRAM controller and LST SRAM array. This means that DRAM and LST accesses may need to be aborted when the decode logic determines that the request was to a remote rather than local memory space.

The current plan of record is to have the Local PORQ with a depth of 4. The Remote PORQ is planned to have a depth of 4. The effective queue depth for remote decodes is effectively larger since the Remote PORQ feeds directly to the Inbound Request Queue on the I/O bus.

The elements within an entry in the Local and Remote PORQs(or I/O ORQs) are shown in the table below.

TABLE X

Outbound Request Queue Contents

| Signal | Phase | Definition |
|---|---|---|
| Local Decode Queue Contents (Local PORQ or Local IORQ) | | |
| A[35:3] | A | Outbound request address from processor bus |
| Req[4:0] | A | Outbound request command, as defined in Pentium ® Pro processor external product literature available from Intel Corporation of Santa Clara, California. |
| Writeback | A | Indicates that the non-MIC request WILL receive an implicit writeback. This bit is only needed on the I/O ORQ. |
| MIC Writeback | A | Indicates that the MIC request may receive an implicit writeback. This gives the DRAM controller earlier indication of a potential pending writeback. This bit is used on both the CPU and I/O bus Local ORQS; it is a decode of the ATT_REQ# request field on the I/O bus and on the CPU side is internally routed from the CPU IRQ head to the loading of the CPU Local ORQ. This bit is only valid if the MIC bit is equal to "I". |
| Lock | A | Indicates this request is part of a locked sequence. |
| MIC | A | Indicates this request is a MIC; needed to determine whether to route request to DRAM controller and/or to Pending Buffer block. On the CPU Local ORQ this is the BPRI bit, on the I/O Local ORQ this must be decoded from the ATT REQ# signals. |
| MIC Initiator[1:O] | B | Encoded what type of initiating cycle caused the MIC. This information is only used when the MIC may contain a Writeback. This field is used on both the CPU and I/O bus Local ORQS; it is a decode of the ATT_REQ# requestfield on the I/O bus and on the CPU side is internally routed from the CPU IRQ head to the loading of the CPU Local ORQ. Its encoding is as follows: 00 - MIC was initiated by a read; 01 - MIC was initiated by a Replacement; 10 - MIC was initiated by a Partial or Part Line write; 11 - MIC was initiated by a Full Line write. |
| BE[7:0] | B | Outbound request byte enables from processor bus |
| SplitLock | B | Indicates this request is the start of a split locked sequence. |
| Db_ptr[1:0] | B | Outbound request data buffer pointer; Loaded from POBE or IOBE. These bits encode one of data buffer numbers 0 through 3. |
| DID[7:0] | B | Deferred reply ID to be used if the current transaction is deferred. This field is used only on the CPU bus ORQ. |
| OwnerID[2:0] | A | OwnerID. This field encodes the bus owner for the current request. This field is used only on the I/O bus ORQ and is provided by the I/O Arbiter logic. The encoding of this field is as follows: 000 IO_GNT[0]; 001 IO_GNT[1]; 010 IO_GNT[2]; 011 IO_GNT[3]; 100 Grant to AMC_NUM = 0; 101 Grant to AMC_NUM = 1; 110 Reserved; 111 Reserved |
| IOP[2:0] | B | Outbound request In-Order-Queue pointer; Loaded from POBE or IOBE. |
| LEN[1:0] | B | Indicates the length of the current accesses, as defined in Pentium ® Pro processor external product literature available from Intel Corporation |
| Aeff[31:20] | A | Effective address (most significant bits), load phase dependent on timing; Loaded from the PDEC or IDEC. |
| Erq[1:0] | N/A | These signals encode the transaction error-response type: "00" - Initial encoding; "01" - Reserved; "10" - Transaction NOT aborted at abort window; "11" - Transaction aborted at abort window |
| Srq[1:0] | N/A | These signals encode the transaction snoop-response type: "00" - Initial encoding; "01" - Transaction will be retried; "10" - Transaction |

TABLE X-continued

Outbound Request Queue Contents

| Signal | Phase | Definition |
|---|---|---|
| | | requires an implicit writeback; "11" - Complete transaction as requested |
| Remote Decode Queue Contents (Remote PORQ or Remote IORQ) | | |
| A[35:3] | A | Outbound request address from processor bus |
| Req[4:0] | A | Outbound request command, as defined in Pentium ® Pro processor external product literature available from Intel Corporation. |
| Lock | A | Indicates this request is part of a locked sequence |
| MIC | A | Indicates this request is a MIC. In the Remote PORQ, this bit reflects the state of BPRI during the request, in the Remote IORQ, this bit reflects the decode of the AT&T__REQ# sideband signals. |
| BE[7:0] | B | Outbound request byte enables from processor bus |
| SplitLock | B | Indicates this request is the start of a split locked sequence |
| SMMEM | B | Indicates this request is accessing SMRAM space |
| Db_ptr[1:0] | B | Outbound request data buffer pointer; Loaded from POBE or IOBE. . These bits encode one of data buffer numbers 4 through 7. |
| DID[7:0] | B | Deferred reply ID to be used if the current transaction is deferred. This field is used on the CPU bus ORQ only. |
| IOP[2:0] | B | Outbound request In-Order-Queue pointer; Loaded from POBE or IOBE. |
| LEN[1:0] | B | Indicates the length of the current accesses, as defined in Pentium ® Pro processor external product literature available from Intel Corporation |
| Erq[1:0] | N/A | These signals encode the transaction error-response type: "00" - Initial encoding; "01" - Reserved; "10" - Transaction NOT aborted at abort window; "11" - Transaction aborted at abort window |
| Srq[1:0] | N/A | These signals encode the transaction snoop-response type: "00" - Initial encoding; "01" - Reserved; "10" - Transaction requires an implicit writeback; "11" - Complete transaction as requested |

3.1.3.2 Inbound Request Queue (PIRQ) 407

The CPU Inbound Request Queue is used to hold MIC requests from either this AMC's MIC Generation logic or from a Remote AMC's MIC Generation logic (routed via the I/O ORQ), or Deferred Replies. The existence of a request(s) in the PIRQ will cause arbitration for the CPU bus as a High Priority agent to perform the MIC or Deferred Reply transaction in a non-deferred manner.

The current plan of record is to have the PIRQ with a depth of 4.

The elements within an entry in the PIRQ (or I/O IRQ) are shown in the table below.

TABLE X

| P6 Inbound Request Queue Contents | |
|---|---|
| Signal | Definition |
| A[35:3] | Inbound request address. A[23:16] hold the DID, if request is a deferred reply in some PIRQ cases. |
| Req[4:0] | Inbound request command, as defined in Pentium ® Pro processor external product literature available from Intel Corporation. Only 3 bits are needed in the PIRQ since only Deferred Replies, Memory Reads, and Memory Read & Invalidates can occur. The 3 bits encode |

TABLE X-continued

| P6 Inbound Request Queue Contents | |
|---|---|
| Signal | Definition |
| | REQ[3:1]. REQ[5,01 = "00". All five bits are needed for the processor I/O bus IRQ (IIRQ). |
| MIC Writeback | Indicates that the MIC request may receive an implicit writeback. This bit is used on both the CPU and I/O bus IRQs; it is used to encode of the ATT__REQ# requestfield on the I/O bus and on the CPU side is internally routed from the CPU IRQ head to the loading of the CPU Local ORQ. This bit is only valid if the MIC bit is equal to "I". |
| Lock | Indicates this request is part of a locked sequence. This bit is not needed in the PIRQ, only in the IIRQ. |
| MIC | This bit is needed on the IIRQ only to tell it that it needs to encode a MIC request on the ATT__REQ# request signals. The AMC can determine MIC status on the CPU bus via the BPRI input. |
| MIC Initiator[1:0] | Encoded what type of initiating cycle caused the MIC. This information is only used when the MIC may contain a Writeback. This field is used on both the CPU and I/O bus Local ORQS; it is used to encode of the ATT__REQ# requestfield on the I/O bus and on the CPU side is internally routed from the CPU IRQ head to the loading of the CPU Local ORQ. Its encoding is as follows: 00 - MIC was initiated by a read; 01 - MIC was initiated by a Replacement; 10 - MIC was initiated by a Partial or Part Line write; 11 - MIC was initiated by a Full Line write |
| BE[7:0] | Outbound request byte enables from processor bus. |
| SplitLock | Indicates this request is the start of a split locked sequence. This bit is not needed in the PIRQ, only in the IIRQ. |
| SMMEM | Indicates this request is accessing SMRAM space |
| Db_ptr[3:0] | Inbound request data buffer pointer. This field may switch to a 2:0 width pending resolution of breaking the data buffers into a Local and Remote array. |
| IOP[2:0] | Outbound request In-Order-Queue pointer. |
| LEN[1:0] | Indicates the length of the current accesses, as defined in Pentium ® Pro processor external product literature available from Intel Corporation |
| HIT | This bit is needed in both the IIRQ and PIRQ to tell the Bus Engine to assert HIT# during the Snoop phase for this request. |
| HITM | This bit is needed in the both the IIRQ and PIRQ to tell the Bus Engine to assert HITM# during the Snoop phase and on the I/O bus to encode a writeback on the ATT__REQ# signals during the Request phase for this transaction. |
| Tag[2:0] | Request tag - used by the OBE in replying to this request. The OBE returns status for this request with the Ir__Status__Valid, Ir__Tag, and Ir__Status handshakes. The Tag bits in the IRQ entry are used to associate the Ir__Status with this particular entry. |

3.1.3.3 Outbound Data Buffer (PODB) 501

The CPU Outbound Data Buffers are used to hold write data from the processors (including implicit writeback data).

The PODB is implemented as a dual-port RAM macro. It is implemented as two banks of RAM. to allow fast enough streaming of data.

In addition to writes, an outbound data buffer is also allocated for P6 bus reads, ready to hold data from a snoop writeback.

The PODB is implemented as two 8 entry data buffers, each entry being a 32 byte line. One of the two data buffers is devoted to local decode transactions, and the other data buffer is devoted to remote decode transactions.

3.1.3.4 Inbound Data Buffer (PIDB) 503

The CPU Inbound Data Buffers are used to hold read data for P6 processor reads (including Deferred Replies). The PIDB is implemented as a dual-port RAM macro. It is implemented as two banks of RAM to allow fast enough streaming of data.

In the case of a Correctable ECC Error, the DRAM controller (usually the "writer" of the PIDB) will need to arbitrate with the PBE for read access to a PIDB element in order to get corrected data to write back into DRAM. The PIDB is implemented as two 8 entry data buffers, each entry being a 32 byte line. One of the two data buffers is devoted to local decode transactions, and the other data buffer is devoted to remote decode transactions.

3.2 I/O Bus Side

3.2.1 I/O Decoder Logic (IDEC) 411

This logic examines every request on the I/O bus and determines whether the request is targeted at this chip (the request should be loaded into its I/O Outbound Request Queue) and whether this chip has the responsibility of providing the Response Phase. Additionally, it decodes whether the request should be forwarded to its DRAM controller unit, or forwarded out onto the CPU bus. I/O bus requests that "target" the AMC include I/O configuration cycles to the AMC, any local memory decodes (even MICs that this AMC issues), all MICs that the other AMC issues, and IOB issued memory cycles that the other AMC asserts AMC_DEC# (which may result in a Transfer Snoop Responsibility (TSR#) MIC). When the other AMC is a bus master, local memory decodes will be routed internally to the DRAM controller, while MIC memory decodes will be routed internally to the PIRQ (for propagating MICs to the CPU bus). The cycles that are potential TSR# MICs may be removed from the AMC Remote ORQ or the AMC PIRQ during the "Transfer Snoop Responsibility" protocol with another AMC in the system. This allows minimizing unnecessary TSR# MICs occurring on the CPU bus.

The I/O Decoder Logic also works with the LST/MIC Control Logic. It can also cancel LST lookups that may have started. when the decode results show the request is targeting Remote memory.

The Decoder on the I/O bus must also examine the ATT_REQa#[2:0] encoding (see later section) which indicates that the request is a coherency MIC.

3.2.2 I/O BUS Engine (IBE) 413

The I/O Bus Engine contains all the (non-arbitration) circuitry necessary for efficient communication between the up to 4 processor bus-to-PCI I/O Bridges (OPBs) on its I/O bus and a Remote AMC. Other architectures may have other agents (caching and non-caching) on this bus as well. The I/O Bus Engine includes the following logic sub-blocks: Bus Tracking Queue and Control, Data Buffer Allocation/Transfer Logic, Control Signal/Response Generation, and Requesting Agent Logic.

3.2.2.1 Bus Tracking Queue and Control

The Bus Tracking Queue (BSTQ) is responsible for tracking all bus transactions that are initiated on the I/O bus. The BSTQ on the P6_I/O side is similar to the BSTQ on the CPU side.

3.2.2.2 Data Buffer Allocation/Transfer Logic The PO Data buffers are allocated similarly to those on the CPU bus side and the Data Transfer logic on the P6_I/O side is similar to that on the P6_CPU bus side.

3.2.2.3 Control Signal/Response Generation

The Response Generation logic generates the response for transactions owned by the AMC on the I/O bus. This will be a smaller percentage of the transactions on the I/O bus than the percentage of transactions owned by the AMC on the CPU bus. The Control Signal Generation logic is similar to that on the CPU bus.

3.2.2.4 Requesting Agent Logic

The Requesting Agent Logic block consists of those elements within the Bus Engine that are required for the AMC to be a bus master on the I/O bus. This block does not include the logic for controlling the High Priority arbitration for the I/O bus. The AMC will become a P6_I/O bus requesting agent for all cycles from its Local CPU bus not targeting its component of main memory and for MICs (BRPs, BILs, or BRILs) that are initiated by its local LST/MIC Generation block targeting a Remote AMC. Per the current plan of record, the I/O bus requesting agent logic will not perform Deferred replies.

3.2.3 P6_I/O Queue Management Unit (IQMU)

The I/O-side Queue Management Unit contains the inbound and outbound request queues and data buffers to/from the I/O bus. Inbound and outbound here are referred to with respect to the processsor bus. This means the Outbound Request Queue contains requests outbound from the I/O bus INTO the AMC; the Inbound Request Queue contains requests inbound to the I/O bus OUT FROM the AMC.

3.2.3.1 Outbound Request Queue (IORQ) 415

The I/O Outbound Request Queue holds pending P6_I/O bus requests targeted at the AMC. Every transaction on the I/O bus is initially loaded into the IORQ; however, the I/O bus Decoder will allow subsequent requests to overwrite previous requests that were not decoded to be to the AMC. The IORQ is actually implemented as two parallel queues, one targeted for local decode requests (Local IORQ), and one targeted for remote decode requests (Remote IORQ). Both queues are loaded in parallel, but only one (or none) of the two is "pushed" (marked as valid). Additionally, configuration address writes (to I/O CF8) are loaded into a Configuration Address register per the Decoder's instruction. 'Me IORQ contains two logical records for each pending request similar to the PORQ. The Remote IORQ contains MICs (or potential MICS) only. Requests "popped" off of the Local IORQ are routed to the DRAM controller; requests "popped" off of the Remote IORQ are routed to the CPU Inbound Request Queue (PIRQ) for forwarding to the CPU bus. The current plan of record is to have the Local IORQ with a depth of 4. 'Me Remote IORQ is planned to have a depth of 4. The effective queue depth for remote decodes is effectively larder since the Remote IORQ feeds directly to the Inbound Request Queue on the CPU bus.

3.2.3.2 Inbound Request Queue (IIRQ) 417

The I/O Inbound Request Queue is used to hold requests from this AMC to either an IOB, Remote main memory, or the Remote CPU bus (due to a MIC). The existence of a request(s) in the IIRQ will cause arbitration for the PO bus. The contents of the IIRQ are detailed in the section on the CPU bus IRQ of this document.

The current plan of record is to have the IIRQ with a depth of 4.

3.2.3.3 Outbound Data Buffer (IODB) 511

The I/O Outbound Data Buffers are used to hold read data for the local P6 processors from an I/O bus slave or write data from a remote processor (this includes implicit writeback data) or IOB to the local DRAM controller. The IODB is implemented as a 2-bank RAM macro similar to the PODB.

The IODB is implemented as two 8 entry data buffers, each entry being a 32 byte line. One of the two data buffers is devoted to local decode transactions, and the other data buffer is devoted to remote decode transactions.

3.2.3.4 Inbound Data Buffer (IIDB) 513

The PO Inbound Data Buffers are used to hold read data for Remote processor or IOB reads of local memory or write data from Local processors (including implicit writeback data) to the P6_I/O bus. The PIDB is implemented as a dual-port RAM macro. It is implemented as two banks of RAM to allow fast enough streaming of data. In the case of a Correctable ECC Error, the DRAM controller (usually the "writer" of the IIDB) will need to arbitrate with the IBE for read access to a IIDB element in order to write the corrected data back into memory.

The IIDB is implemented as two 8 entry data buffers, each entry being a 32 byte line. One of the two data buffers is devoted to local decode transactions, and the other data buffer is devoted to remote decode transactions.

3.2.4 I/O Bus Arbitration 421

The agents on the I/O bus gain access to the bus by first requesting ownership of the priority request signal, BPRI#. The arbitration of ownership of the BPRI# signal is controlled by hardware inside the AMC with AMC_ID=0. If a second AMC is present in the system, the arbiter in the second AMC is disabled and the IO_GNT# signals from the second AMC are tristated. The second AMC requests control of BPRI# by asserting its IO_REQUEST# signal.

In addition to participating in the high priority arbitration, the AMCs may be enabled by software to use symmetric arbitration. Symmetric arbitration is distributed. The symmetric agent that received the last symmetric grant will have the lower priority for determining which agent receives the next symmetric grant. The symmetric arbitration and the high priority arbiter operate independently.

The priority agent arbiter separates requests into two banks and uses a rotating priority scheme (round robin) within each bank. For IOB locked accesses, AMC split lock access, EISA flush requests and GAT mode requests, rotating priority is suspended. At times, during these special operations, some requests are masked and some requests are provided with fixed priority higher than the others. The priority agent arbiter is also responsible for insuring that BPRI# on the CPU bus is asserted, when needed, for these special operations.

Symmetric arbitration is not effected by the masking and prioritization in the high priority arbiter. It is the responsibility of the high priority agent to maintain IO_BPRI# active for as long as it, the agent, requires ownership of the I/O.

This arbiter does not need to implement a retry masking scheme to prevent retried agents from wasting bus bandwidth while the retry condition is being resolved because the IOB will not continuously retry attempts that have been retried.

The sample on reset pin EXTERNAL_ARB# should be able to disable this arbiter in order to use an external arbiter.

3.3 LST/MIC Generation Logic

Every request to this AMC's contribution to system main memory must be "processed" by this logic. This includes requests from the CPU and I/O busses, and therefore requires arbitration for this single resource. This logic includes an interface to external LST RAM to determine and update the requested line's state and logic to build and generate MIC requests and process their subsequent responses.

3.3.1 LST Arbiter/Interface to CPU and P6_I/O Interfaces 431 and 432

This logic controls arbitration between the CPU interface and I/O interface for the LST and DRAM Interface. Because in some situations simultaneous requests on both the CPU and I/O bus to the AMC will occur, the arbitration loser will introduce snoop stalls until the LST logic can resolve the Snoop Phase. Snoop stalls are not introduced by the AMC for MIC requests under any conditions. The LST access is done in parallel to the basic decode done by the bus decoder logic and if the decoder determines that the request is not to this AMC's memory space the request for the LST/DRAM will be aborted.

3.3.2 LST RAM Interface 425

This interface controls accessing the LST RAM for the purpose of examining the current caching status of a requested memory line. It includes the combinational logic necessary to compute the new caching status and whether a MIC is required to update the coherency in processor caches. Parity is checked on all LST reads and all LST parity errors are nonfatal. LST parity errors are reported via the SBCERR# (Single Bit Correctable Error) interrupt pin.

The LST RAM array can be initialized by one of two means: 1) software-intensive, or 2) hardware-initiated. Both methods will leave each cache line's entry in the default cache state of "Shared Local" with correct parity.

The software-intensive method of LST initialization requires first clearing the Enable Coherency bit (bit 3) of the Extended Diagnostic Control register. Then software must access each cache line associated with this AMC's memory space. This procedure is similar to the original LST initialization used in the Voyager MMC-based systems.

3.4 Pending Buffer 435/Deferred Reply Generator 437

The Pending Buffer is responsible for maintaining the coherency of transactions that have been deferred on the CPU Bus (pending a remote MIC subtraction or remote request) or accepted on the I/O Bus (pending a local MIC subaction). This logic is separated into two main pieces, a Local Pending Buffer and a Remote Pending Buffer.

3.4.1 Local Pending Buffer

The Local Pending Buffer maintains the coherency of transactions that target local memory that require a MIC subaction. This includes CPU Bus transactions for which a remote MIC is issued on the I/O Bus; and I/O Bus transactions for which a local MIC is issued on the CPU Bus (note that the MIC address always decodes to memory that is local to the AMC that generates it, however, local and remote in this context refer to the CPU Bus to which the MIC is targeted for issue). This block allocates a buffer entry when a MIC is generated and tracks the MIC completion. MIC completion occurs when the MIC is seen at the head of the ORQ of the target bus and snoop results are returned for the MIC. Upon MIC completion, either a Deferred Reply is generated to he issued on the CPU Bus (thus completing the CPU Bus transaction that was deferred because a remote MIC was required), or an In-Order Response is given on the I/O Bus (thus completing the I/O Bus transaction that initiated the local MIC). 'Me Pending Buffer maintains coherency of these transactions by attempting to retry subsequent colliding transactions issued on either the CPU or I/O Bus. The Pending Buffer will not always be able to successfully force a colliding transaction to be retried. The exceptions occur when a HITM is asserted during the snoop phase which forces in-order completion of that transaction. These exceptions are described in detail in Section I 1, Handling Transaction Collisions.

3.4.2 Remote Pending Buffer

The Remote Pending Buffer maintains the coherency of transactions that target remote memory that are issued and deferred on the CPU Bus. This block allocates a buffer entry when a remote targeted transaction is issued by a CPU and deferred on the CPU Bus. The block then generates a corresponding transaction to be issued on the I/O Bus and tracks the completion of this transaction. Upon completion on the I/O Bus, the block generates a Deferred Reply to be issued on the CPU Bus, thus completing the CPU Bus transaction that was initially deferred. Remote writebacks (either implicit or explicit), although not deferrable, will cause an allocation in the Remote Pending Buffer. The transaction will complete in order on the CPU Bus, but it is still the responsibility of this block to maintain the coherency of these writebacks until their completion on the I/O Bus. Essentially, these writebacks are posted by the Remote Pending Buffer. Coherency is maintained in a similar manner to that described above for the Local Pending Buffer. Again refer to Section I 1, Handling Transaction Collisions for more details.

3.4.3 Retry Queue

In order to insure forward progress, a Retry Queue for each pending entry is maintained. As agents are retried to maintain coherency of pending transactions, they are placed in a corresponding Retry Queue. Once the pending transaction is completed, the Retry Queue insures that a slot is reserved for those retried agents. Reservation of a slot is necessary to insure that an agent is not retried continually, resulting in a lack of forward progress. Slot reservation for a particular address is enforced by retrying agents that attempt to access the address when they are not at the head of the Retry Queue. Forward progress issues are discussed in greater detail in Section 5.2, Forward Progress.

3.5 DRAM Controller 441

The AMC DRAM Controller will operate with the same basic functionality as existing SHV memory controllers, such as is shown in FIG. 1. This implies that the performance of the DRAM Controller will equal that of existing SHV memory controllers, and the external interface to the DRAM array (via MIC chips) will be identical. One feature that the AMC will add above that existing SHV memory controllers is the tolerance for using Extended Data Out (EDO) DRAMs. This feature is desirable due to the greater availability and possibly lower price of EDO DRAMs over Fast Page Mode DRAMs in the near future.

It can thus be seen that there has been provided by the present invention a multiple bus symmetric multiprocessor system constructed from industry standard SHV commodity components together with an improved dual-ported memory controller offering superior performance over existing single bus systems. The system, as described above, includes up to four processors, a snooped processor bus connected to system memory through a first port on the dual-ported memory controller for managing processor to memory transactions and an I/O bus connected to a second port on the dual-ported memory controller for managing I/O transactions. Additionally, the I/O bus, also referred to as an expansion bus, may be utilized to connect two or more such systems together, creating an SMP system having eight or more processors.

Those skilled in the art will recognize that the present invention is not limited to the specific embodiments described above. For example, the present invention is not limited to a system employing Intel Pentium® Pro processors or Pentium® Pro processor busses. Rather, the invention is applicable to any multiprocessor system employing multiple processors (Intel, Motorola, RISC, etc.) and multiple snooped, multiple mastered busses.

Although the presently preferred embodiment of the invention has been described, it will be understood that various changes may be made within the scope of the appended claims.

What is claimed is:

1. A computer system comprising:
   a first processor bus;
   a first plurality of processors having cache memories, the first plurality of processors coupled to the first processor bus;
   a second processor bus;
   a second plurality of processors having cache memories, the second plurality of processors coupled to the second processor bus;
   a memory controller coupled to the first processor bus and to the second processor bus, the memory controller to control data flow to and from the first processor bus and the second processor bus; and
   a system memory coupled to the memory controller, the system memory to store a set of memory state bits for each line in the system memory, the memory state bits indicating ownership for an associated line in system memory, the memory state bits also indicate sharing information corresponding to a first bus and a second bus for the associated lines in the system memory.

2. The computer system of claim 1 wherein the memory state bits indicate sharing information for an associated line in system memory corresponding to a first bus and a second bus.

3. The computer system of claim 1 wherein the memory state bits comprise three bits for each line in the system memory.

4. A method comprising:
   accessing a line in a system memory;
   managing coherency of the line in system memory with corresponding lines stored in cache memories coupled to individual processors in a multiprocessor computer system, the managing accomplished with a memory controller; and
   determining, based, at least in part, on a set of memory state bits, ownership and sharing information for corresponding lines in the system memory, wherein the ownership information indicates ownership of the corresponding lines in system memory by a processor coupled to one of a first processor bus and a second processor bus, and further wherein the sharing information indicates whether the corresponding lines in system memory are shared between the first processor bus and the second processor bus.

5. The method of claim 4 wherein the memory state bits indicate sharing information for an associated line in system memory corresponding to a first bus and a second bus.

6. The method of claim 4 wherein the memory state bits comprise three bits for each line in the system memory.

7. An apparatus comprising:
   means for accessing a line in a system memory;
   means for managing coherency of the line in system memory with corresponding lines stored in cache memories coupled to individual processors in a multiprocessor computer system, the managing accomplished with a memory controller; and
   means for determining, based, at least in part, on a set of memory state bits, ownership and sharing information for corresponding lines in the system memory, wherein the ownership information indicates ownership of the corresponding lines in system memory by a processor coupled to one of a first processor bus and a second processor bus, and further wherein the sharing information indicates whether the corresponding lines in system memory are shared between the first processor bus and the second processor bus.

8. The apparatus of claim 7 wherein the memory state bits indicate sharing information for an associated line in system memory corresponding to a first bus and a second bus.

9. The apparatus of claim 7 wherein the memory state bits comprise three bits for each line in the system memory.

* * * * *